United States Patent [19]

Enomoto

[11] Patent Number: 4,783,774
[45] Date of Patent: Nov. 8, 1988

[54] CONTROL SYSTEM FOR OPTICAL INFORMATION REPRODUCING APPARATUS

[75] Inventor: Akihiko Enomoto, Tokyo, Japan

[73] Assignee: Kabushiki Kaisha Toshiba, Japan

[21] Appl. No.: 1,332

[22] Filed: Dec. 23, 1986

[30] Foreign Application Priority Data

| Dec. 24, 1985 | [JP] | Japan | 60-291312 |
|---|---|---|---|
| Dec. 24, 1985 | [JP] | Japan | 60-291313 |
| Dec. 24, 1985 | [JP] | Japan | 60-291314 |
| Dec. 24, 1985 | [JP] | Japan | 60-291315 |
| Dec. 24, 1985 | [JP] | Japan | 60-291316 |
| Dec. 24, 1985 | [JP] | Japan | 60-291317 |
| Dec. 24, 1985 | [JP] | Japan | 60-291318 |
| Dec. 24, 1985 | [JP] | Japan | 60-291319 |
| Dec. 24, 1985 | [JP] | Japan | 60-291320 |
| Dec. 24, 1985 | [JP] | Japan | 60-291321 |

[51] Int. Cl.$^4$ .......................... G11B 19/24; G11B 7/00
[52] U.S. Cl. .......................... 369/44; 369/45; 369/50; 318/599
[58] Field of Search .................... 369/43–45, 369/47, 49, 50, 58; 360/73; 318/599

[56] References Cited

U.S. PATENT DOCUMENTS

| 4,402,070 | 8/1983 | Sugiyama et al. | 369/43 |
|---|---|---|---|
| 4,470,078 | 9/1984 | Hirata et al. | 369/43 X |
| 4,599,545 | 7/1986 | Monki et al. | 318/599 X |
| 4,613,799 | 9/1986 | Sumi | 318/599 X |
| 4,646,280 | 2/1987 | Toyosawa | 369/50 |

Primary Examiner—Aristotelis M. Psitos
Attorney, Agent, or Firm—Finnegan, Henderson, Farabow, Garrett and Dunner

[57] ABSTRACT

A control system for an optical disc information reproducing apparatus in which information data stored in an optical disc is read out during a rotation of the optical disc by a light spot of a light beam. The system includes a laser device for generating the light beam, a device such a turntable for rotatably supporting the optical disc or a pickup device for relatively moving the optical disc and the light spot of the light beam, a photoelectric transducer responsive to the light beam reflected from the optical disc for reproducing the information data from the optical disc during the rotation of the optical disc, the photoelectric transducer producing an electrical signal corresponding to the information data, a circuit for deriving a servo control signal from the reproduced signal, a circuit for modulating the servo control signal to a pulse width modulation (PWM) signal, a device such a turntable drive motor or a pickup transfer motor responsive to the PWM signal for driving the turntable or the pickup device, a circuit for producing a response control signal, and a drive circuit for applying the turntable motor or the pickup transfer motor with a power supply voltage which is changeable in response to the response control signal.

38 Claims, 14 Drawing Sheets

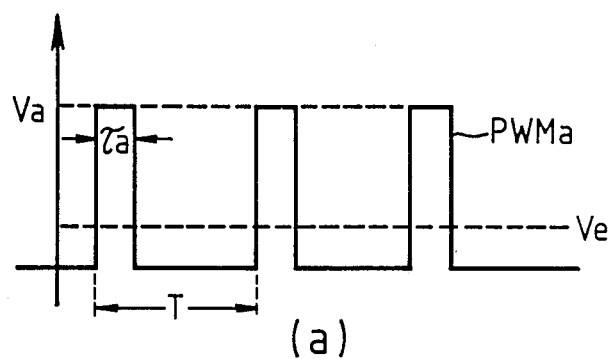
(a)
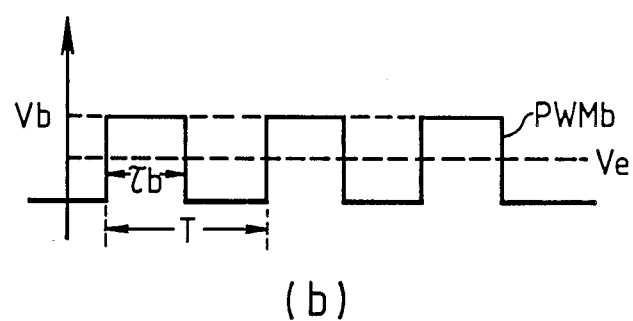
(b)
FIG. 3.

CONTROL SYSTEM FOR OPTICAL INFORMATION REPRODUCING APPARATUS

BACKGROUND OF THE INVENTION

Field of the invention

The present invention relates to a control system for optical disc information reproducing apparatus, and more particularly to a control system for a moving device such as disc rotation drive motors, pickup transfer drive motors, pickup lens focusing or tracking actuators of optical disc players such as digital audio disc plyers, video disc players or memory disc apparatus.

Description of the Prior Art

There have been provided optical record discs which store optically recorded information data or signals such as digitized audio signals, video or image signals and any other information data and optical record disc reproducing apparatus for reproducing the recorded information data. The optical record discs of such type, for example, compact discs (CD) (a type of digital audio discs), optical video discs, optical image discs and the like are so arranged that digital data intended for high density recording are recorded in the form of pit strings forming a spiral track or plurality of concentric tracks on one side of the optical disc and reproduced through reading the pit strings by means of transducer means like an optical pickup device using laser beams during a rotation of the optical record disc at a predetermined velocity.

The disc reproducing apparatus are provided with a rotation drive motor for rotating the optical disc at the predetermined velocity. In the compact disc players, for example, the rotation drive motor drives compact discs at a constant linear velocity (CLV). While, the rotation drive motor of the video disc players drives video discs at a constant angular velocity (CAV). The rotation velocities of the disc rotation drive motors are controlled to keep the CLV or CAV velocity in constant in the disc reproducing operation. The rotation velocity can be maintained to keep the predetermined CLV or CAV state with a relatively low power consumption during the normal disc reproducing operation. There, however, is required a relatively large power consumption for bringing the disc rotation drive motors from a stop state to the predetermined velocity state or vice versa at a start to the disc reproducing operation or at an interruption to a reproducing stop state.

The disc reproducing apparatus also is provided with a pickup transfer drive motor for transferring the optical pickup in the radial direction of the optical discs. The transfer speed of the pickup transfer drive motor is controlled at a relatively low speed in the disc reproducing operation. Therefor the transfer speed at that time can be maintained in constant with a relatively lower power consumption. While the optical pickup device is transferred at a relatively high speed from one position to another position at a long distance track search operation, the reproducing start operation and the reproducing stop operation. At the operations, there is required a relatively large power consumption for bringing the pickup transfer drive motor from the low speed transfer state to the high speed transfer state or vice versa.

The disc reproducing apparatus also is provided in the optical pickup device a lens, a focusing actuator and a tracking actuator. The lens places the laser beam on the record disc. The focusing actuator drives the lens in the perpendicular direction of the optical disc or the longitudinal direction of the light beam for controlling a focus of the laser beam on the optical disc. The tracking actuator drives the lens in the radial direction of the optical disc or the perpendicular direction of the light beam for controlling the laser beam to follow the track of the optical disc.

The actuators adjust or shift a location of the lens in a relatively narrow distance range with a relatively low power consumption at the ordinary reproducing operation. While the actuators are required to shift the lens in a relatively wide distance range to make the laser beam focus or track on a given track of the optical disc at the shorts distance track search operation, the reproducing start operation and the reproducing stop operation. At the operations, there is required a relatively large power consumption of the actuators to shift the lens in the wide distance range.

Further the actuators are required to fail for shifting the lens at an occurence of failures of the information data pickup, e.g., signal dropouts in the optical pickup device. At that time, it is required that the actuators are given a power less than the power at the normal disc reproducing operation.

The moving devices such as the disc rotation drive motor or the like are servo controlled by some servo control signal obtained from the reproduced information data through the optical pickup device for keeping the optical disc or the like in a proper state of the rotation velocity or the like during the normal disc reproducing operation. As the servo control signal, a tracking error signal, a focusing error signal or a synchronous control signal such as an automatic frequency control (AFC) signal can be used. While at a prescribed state such as the start operation, the search operation or the like, the moving devices are controlled by some other signal for compelling the prescribed state, such as a start command signal given from an operation control section or a signal indicating an abnormal in the servo control signal. Then a power supply for the moving devices are controlled by the servo control signal or the compelling signal.

By the way, a demand for a portable use has increased in the field of compact disc players and video disc players. In the portable disc players, batteries are generally used as a power source for driving the moving devices. As is well known, a problem arises in designing the portable disc players in particular for lowering the power consumption and the power supply voltage as little as possible.

To solve the problem, the power supply for driving the moving devices popularly is performed in the field of the portable disc players by using a PWM (pulse width modulation) technique. The reason is that the PWM power supply has a higher efficiency of a power conversion from the electric energy to the kinetic energy.

However, in a conventional disc reproducing apparatus, particularly in a portable disc reproducing apparatus using the PWM power supply as described above, the following problem arises in respect of the power conversion efficiency at driving loads (moving devices).

However, in a conventional compact disc player using the PWM technology as described above, the following problem arises in respect of the efficiency at driving the load (pickup drive motor) by a pulse width modulation signal, that is, in respect of the conversion efficiency from electric energy to kinetic energy.

First, an electric power W at driving the load by a pulse width modulation (PWM) signal is expressed by the following equation:

$$W = E^2 / R \tag{1}$$

where R is the resistance of the load, and E is the effective voltage of the PWM signal. FIG. 1 is a graph showing the waveform of the PWM signal.

When taking a cycle of the PWM signal as T and an instantaneous voltage as e, the effective voltage E becomes as follows:

$$E = \sqrt{\frac{1}{T} \cdot \int_0^T e^2 \cdot dt} \tag{2}$$

When dividing the instantaneous voltage e into sine wave (high harmonic) components $e_n$ (n is a positive integer, i.e., n = 1, 2, 3 ...) by Fourier series conversion respectively, the maximum voltage $E\max_n$ of the sine wave components $e_n$ becomes as follows:

$$e_n = E\max_n \cdot \sin(n\omega t + \theta n) \tag{3}$$

where $\omega$ is an angle frequency of the PWM signal.
The effective voltage E becomes as follows.

$$E = \sqrt{Eo^2 + \left(\frac{E\max_1}{2}\right)^2 + \left(\frac{E\max_2}{2}\right)^2 + \ldots} \tag{4}$$

where, Eo is a direct current (DC) component.

The performing Fourier series conversion of the PWM signal as shown in FIG. 1, the following equation is obtained.

$$e(\omega t) = \frac{V \cdot \omega \cdot \tau}{2\pi} + \frac{V}{\pi} \cdot \sum_{n=1}^{\infty} \frac{1 - \cos n\omega\tau}{n} \cdot \sin n\omega t + \tag{5}$$

$$\frac{V}{\pi} \cdot \sum_{n=1}^{\infty} \frac{\sin n\omega t}{n} \cdot \cos n\omega t$$

Substituting $\omega = 2\pi/T$, the following equation is obtained.

$$e(\omega t) = \frac{\tau \cdot V}{T} + \frac{V}{\pi} \cdot \sum_{n=1}^{\infty} \frac{1 - \cos(2n\pi\tau/T)}{n} \sin n\omega t + \tag{6}$$

$$\frac{V}{\pi} \cdot \sum_{n=1}^{\infty} \frac{\sin(2n\pi\tau/T)}{n} \cos n\omega t$$

When obtaining the effective voltage E from above equation, $$E = \sqrt{\frac{\tau V}{T} + \left(\frac{V}{\sqrt{2}\pi} \cdot \sum_{n=1}^{\infty} \frac{1 - \cos(2n\pi\tau/T)}{n}\right)^2 + \left(\frac{V}{2} \cdot \sum_{n=1}^{\infty} \frac{\sin(2n\pi\tau/T)}{n}\right)^2} \tag{7}$$

In the above equation, only the DC component Eo ($Eo = \pi V/T$) of the PWM signal is essentially a voltage to be converted into an effective kinetic energy and other higher harmonic components become ineffective. As a result, the power conversion efficiency can be obtained by obtaining the ratio (Eo/E) of the DC component Eo and the effective voltage E. As will be clear from the equation described above, the effective voltage E is a function of $\tau/T$, that is, the ratio (hereinafter) called as duty ratio) of the ON time period or the pulse width $\tau$ of the PWM signal and the cycle T of the PWM signal. It is clear that the power conversion efficiency depends on the duty ratio.

FIG. 2 is a diagram showing the characteristic of the power conversion efficiency to the duty ratio when the PWM signal of the carrier frequency 44.1 kHz at the peak value of 1V is applied to a load with the resistance R. In this case, it is assumed that the pulse width $\tau$ is varied while the cycle T of the PWM signal is made constant, thereby to change the duty ratio.

In FIG. 2, the solid line shows the actually measured value of the power conversion efficiency characteristic, while the broken line shows the value obtained from theoretical calculation made by dividing the value of the DC component Eo by the effective voltage e obtained from equation (7) for the higher harmonics from the first order (n = 1) to the 100th order (n = 100).

As is clearly understood from the power conversion efficiency characteristics shown in FIG. 2, it is theoretically and experimentally clarified that the power conversion efficiency is remarkably reduced as the duty ratio is decreased, that is, as the pulse width $\tau$ is shortened.

This means that for the same effective voltage Ve can be obtained from two kinds of PWM signals PWMa and PWMb, the former PWMa having a larger peak value Va and the latter PWMb having a smaller peak value Vb while the former PWMa having a narrower pulse width $\tau$a and the latter having a wider pulse width $\tau$b as shown in FIG. 3a and FIG. 3b. However, the power conversion efficiency of the latter PWM signal PWMb shown in FIG. 3b is higher than that of the former PWM signal PWMa shown in FIG. 3a.

Due to the above reason, it is advantageous that a PWM signal having the largest duty ratio if PWM signals with the same effective voltage is used to drive a load, e.g., the moving device like the disc rotation drive motor. However, PWM signals are required that they have a fairly high effective voltage sufficient to make the moving device move at a high speed at the prescribed operation such as the start of the disc reproducing operation as described above. From this purpose, it is also necessary to set the peak value of a PWM signal as high as possible.

PWM signals normally are applied to motors after amplified through some amplifiers. The peak value of the PWM signal is therefore inevitably determined by the power supply voltage applied to the amplifier in the conventional disc reproducing apparatus. In this case, the PWM signal is oblidged to have a relatively low duty ratio in the normal reproducing operation state so that the moving device moves the optical discs with a relatively large power consumption.

SUMMARY OF THE INVENTION

Accordingly, an object of the present invention is to provide a control system for optical information reproducing apparatus which is able to a drive moving device of the reproducing apparatus with a relatively low power consumption.

Another object of the present invention is to provide a control system for optical information reproducing apparatus which is able to drive a moving device of the reproducing apparatus with a relatively high power conversion efficiency from the electric energy to the kinetic energy.

A further object of the present invention is to provide a control system for optical information reproducing apparatus which is able to drive a rotation drive motor of the reproducing apparatus for an optical disc with a relatively low power consumption or a relatively high power conversion efficiency from the electric energy to the kinetic energy, at a prescribed disc control state as well as at a normal disc reproducing operation state.

A further object of the present invention is to provide a control system for optical information reproducing apparatus which is able to drive a transfer drive motor for an optical pickup of the reproducing apparatus with a relatively low power consumption or a relatively high power conversion efficiency from the electric energy to the kinetic energy, at a prescribed pickup control state as well as at a normal disc reproducing operation state.

A further object of the present invention is to provide a control system for optical information reproducing apparatus which is able to drive a focusing actuator for a laser beam control lens of the reproducing apparatus with a relatively low power consumption or a relatively high power conversion efficiency from the electric energy to the kinetic energy, at a prescribed focusing actuator control state as well as at a normal disc reproducing operation state.

A further object of the present invention is to provide a control system for optical information reproducing apparatus which is able to drive a tracking actuator for a laser beam control lens of the reproducing apparatus with a relatively low power consumption or a relatively high power conversion efficiency from the electric energy to the kinetic energy, at a prescribed tracking actuator control state as well as at a normal disc reproducing operation state.

In order to achieve the above objects, one aspect of the control system for optical information reproducing apparatus according to the present invention in which information data stored in an optical disc is read out during a rotation of the optical disc by a light spot of a light beam, includes a light beam source such as a semiconductor laser beam device, a moving device such as a turntable for rotatably supporting the optical disc, a device responsive to the light beam reflected from the optical disc such as a photoelectric transducer, the photoelectric transducer producing an electrical signal corresponding to the information data, a circuit for deriving a servo control signal from the reproduced signal such as a tracking error signal producing circuit, a circuit for modulating the servo control signal to a pulse width modulation (PWM) signal, a drive device such as a motor responsive to the PWM signal for driving the moving device, a source for producing a response control signal, and a circuit for applying the drive with a power supply voltage which is changeable in response to the response control signal.

Additional objects, advantages, and features of the present invention will further become apparent to persons skilled in the art from a study of the following description and of the accompanying drawings, in which:

BRIEF DESCRIPTION OF THE DRAWINGS

FIGS. 3a and 3b are graphs showing waveforms of PWM signals for describing the problem of power conversion efficiency regarding to the duty ratio in the conventional disc reproducing apparatus;

DESCRIPTION OF THE PREFERRED EMBODIMENTS

Figure 1:
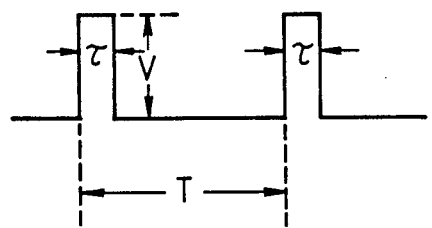
FIG. 1 is a graph showing a waveform of a PWM signal.
Figure 2:
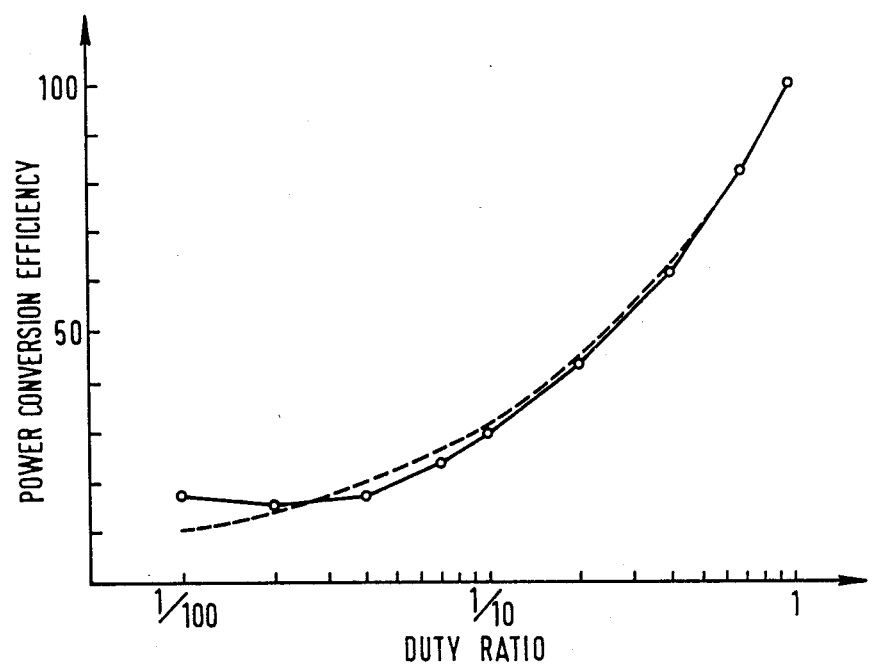
FIG. 2 is a graph showing the power conversion efficiency characteristics of a PWM signal to the duty ratio.

The present invention will now be described in detail with reference to the accompanying drawings, namely, FIGS. 4 to 16. Throughout the drawings, like reference numerals and letters are used to designate elements like or equivalent to those used in FIGS. 1 to 3b (Prior Art) for the simplicity of explanation.

Figure 4:
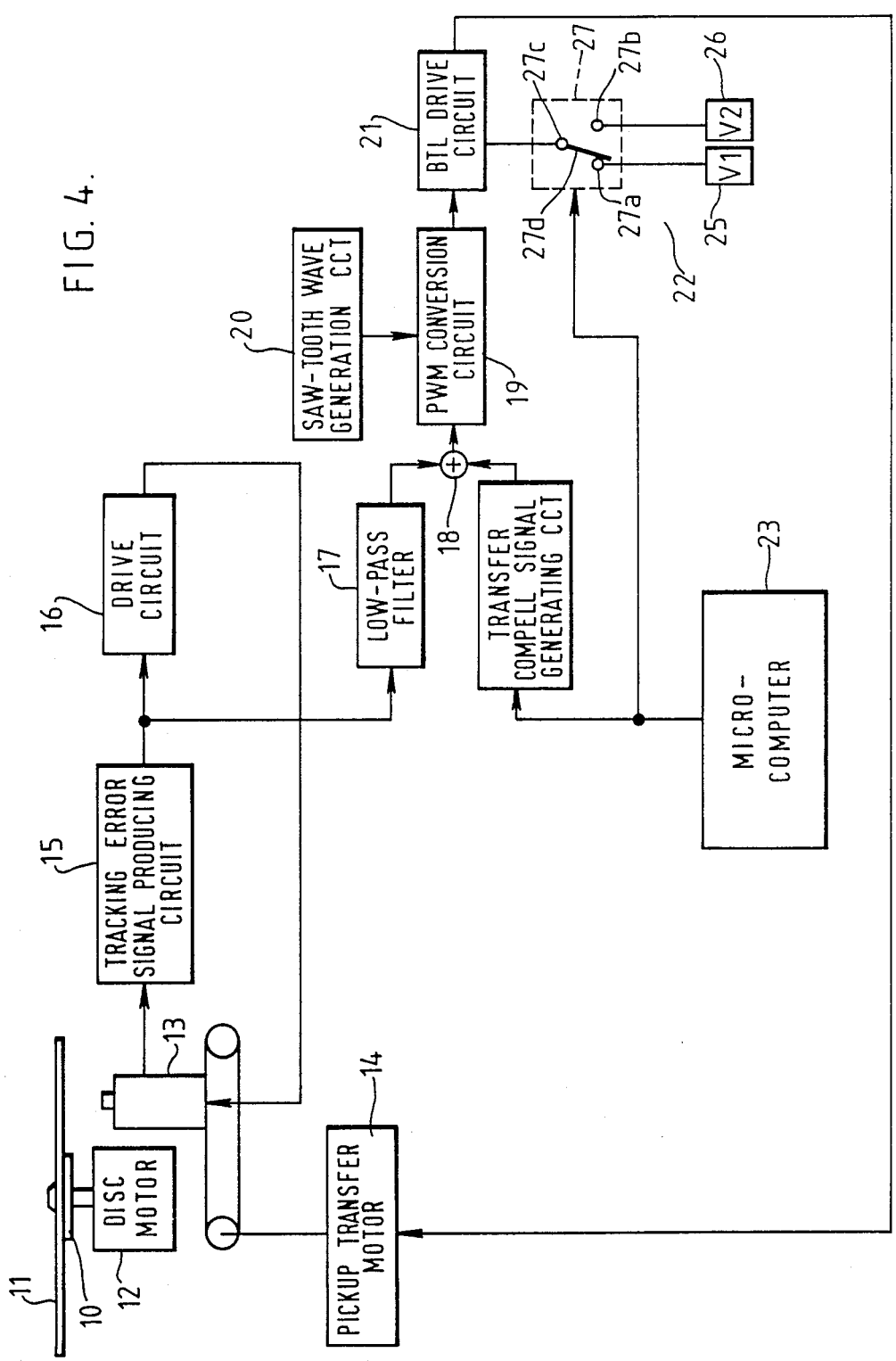
FIG. 4 is a block diagram showing a first embodiment of a control system for disc reproducing apparatus according to the present invention.

Referring now to FIG. 4, a first embodiment of the present invention will be described in detail. FIG. 4 shows a block diagram of a compact disc player. In FIG. 1, the compact disc player is provided with a power supply circuit using the PWM technique. In the drawing, and optical disc 11 is supported on a turntable 10. The turntable 10 is provided rotatably to a disc motor 12. Under the optical disc 11 in the drawing, an optical pickup 13 is provided movably in the radial direction of the optical disc 11. The optical pickup 13 is transferred by a pickup transfer motor 14 in the radial direction of the optical disc 11.

Figure 5:
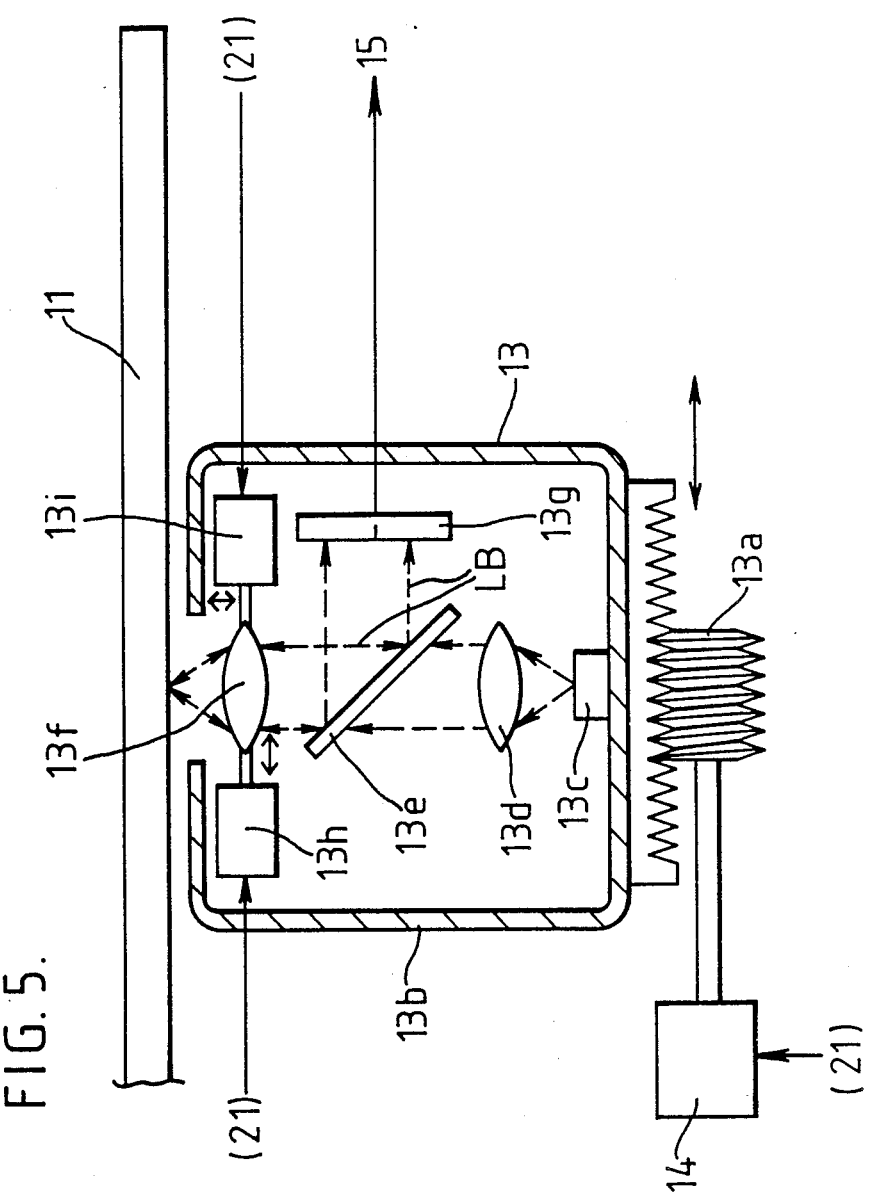
FIG. 5 shows a detail construction of an optical pickup of the embodiment of FIG. 4.

Referring now to FIG. 5, a symbolically represented optical pickup device 13 is movably supported on a feeder 13a. The feeder 13a is driven by a pickup transfer motor 14 as described later so that optical pickup device 13 moves radially in reference to the surface of the optical disc 11. The optical pickup 13 comprises a carriage 13b, a source of a light beam, e.g., a semiconductor laser device 13c, a collimater lens 13d, a semi-transparent mirror 13e, a device for placing a laser beam LB on the optical disc 11, e.g., a objective lens 13f, a split photosensor 13g, a tracking actuator 13h and a focusing actuator 13i. The laser device 13c radiates the laser beam LB. The collimater lens 13d, the semi-transparent mirror 13e and the objective lens 13f guides the laser beam LB to the optical disc 11 so that the laser beam LB is placed on the optical disc 11 in a form of light spot. The optical pickup 13 then scans concentric tracks of the optical disc 11 one after another or a spiral track of the optical disc 11 with the light spot of the laser beam LB, in moving radially in a direction of an arrow A in the drawing during the disc reproducing operation. The laser beam LB is reflected by the optical disc 11 and then applied to the split photosensor 13g through the objective lens 13f and the semi-transparent mirror 13e. The split photosensor 13g detects from the reflected laser beam LB information data responding to a state, e.g., a strength of the reflected laser beam LB and produces an electrical signal responding to the information.

The objective lens 13f is movably mounted on the carriage 13b of the optical pickup 13. The tracking actuator 13h controls a position of objective lens 13f in the radial direction of the optical disc 11 so that the light spot of the laser beam LB follows a center of a prescribed track in, e.g., the reproducing operation. The tracking control of the objective lens 13f may be made by a tracking control system a follows, like a conventional one. The focusing actuator 13i controls the position of objective lens 13f in the perpendicular direction to the surface of the optical disc 11 so that the laser beam LB is accurately focused its light spot on a prescribed track in, e.g., the reproducing operation. The focusing control of the objective lens 13f also may be made by a focusing control system as follows, like a conventional one.

Referring back to FIG. 4, a reproduced signal is obtained from the optical pickup 13 in the disc reproducing operation. The reproduced signal is applied to a tracking error signal producing circuit 15 and a tracking error signal TE corresponding to the tracking shift of the objective lens 13f (see FIG. 5) provided in the optical pickup 13 is produced. This tracking error signal TE is applied to the tracking actuator 13h (see FIG. 5) for moving the objective lens 13f in the optical pickup 13 in the radial direction of the optical disc 11 through a drive circuit 16 to perform a tracking servo control.

The tracking error signal TE is applied to a low-pass filter circuit 17, and after that high frequency components of the tracking error signal TE are removed. The tracking error signal TE is applied to a pulse with modulation (PWM) conversion circuit 19 through an adder 18. The PWM conversion circuit 19 produces a pulse width modulation (PWM) signal by comparing the level of the tracking error signal TE outputted from the low-pass filter circuit 17 with a reference saw-tooth wave signal which is outputted from a saw-tooth wave generation circuit 20. Therefore, the tracking error signal TE is converted to a pulse signal, i.e., the PWM signal which has a pulse width responding to the level of the tracking error signal TE.

The PWM signal for the normal disc reproducing operation is applied to a balanced transformerless (BTL) drive circuit 21. The BTL drive circuit 21 amplifies the peak level of the PWM signal up to a power supply voltage applied from a selectable power supply circuit 22 as described later. The amplified PWM signal is applied to the pickup transfer drive motor 14. Thus, the pickup transfer drive motor 14 controls the transfer speed of the optical pickup 13. As a result, the optical pickup 13 is transferred at a relatively low speed corresponding to the disc reproducing operation in the radial direction of the optical disc 11.

Next, when a track jump for a relatively long distance is commanded to the optical pickup 13 for, e.g., a long distance search operation, a long distance search operation command data corresponding to the distance and the direction for moving the optical pickup 13 to a prescribed position on the optical disc 11 at a high speed is generated from an operation control circuit such as a microcomputer 23. The search operation command data is applied to a transfer compelling signal generation circuit 24. The transfer compelling signal generation circuit 24 generates a transfer compelling signal corresponding to the search operation command data. The transfer compelling signal is applied to the PWM conversion circuit 19 through the adder 18, thereby to produce a PWM signal which has a pulse width responding to the level of the transfer compelling signal. The PWM signal for the search operation has a pulse width responding to the level of the transfer compelling signal. The PWM signal is amplified through the BTL drive circuit 21 and then applied to the pickup transfer drive motor 14. Thus, the pickup transfer drive motor 14 controls the transfer speed of the optical pickup 13. As a result, the optical pickup 13 is transferred at a relatively high speed. corresponding to the search operation in the radial direction of the optical disc 11 to perform the track jump.

Further, the search operation command signal is applied to the selectable power supply circuit 22. The selectable power supply circuit 22 is comprised of a first and second power supply sources 25 and 26 and a controllable selector switch 27. The first power supply source 25 produces a first power supply voltage V1. The second power supply source 26 produces a second power supply voltage V2 which is higher than the first power supply voltage V1. These power supply sources 25 and 26 are connected to a first and second fixed contact 27a and 27b of the controllable selector switch 27. A common contact 27c of the controllable selector switch 27 is connected to the power supply input terminal of the BTL drive circuit 21. The common contact 27c is selectively connected to the first and the second fixed contact 27a and 27b. In the normal disc reproducing operation, the common contact 27c is connected to the first fixed contact 27a through a selector blade 27d. Accordingly, the first power supply voltage V1 is applied to the BTL drive circuit 21 together with the PWM signal converted from the tracking error signal TE. When the search operation command signal is applied to the selectable power supply circuit 22, the common contact 27c is connected to the first fixed contact 27a through the selector blade 27d. Thus, the second power supply source 26 is selected to a connection to the controllable selector switch 27 so that the second power source voltage V2 is applied to the BTL drive circuit 21 together with the PWM signal converter from the transfer compelling signal or the search operation.

Therefore, in the track jump operation or the search operation, the second power supply voltage V2 is applied to the BTL drive circuit 21. At that time, the peak level of the amplified PWM signal outputted from the BTL drive circuit 21 has a relatively high level, i.e., the second power supply voltage V2. Thereby the duty ratio of the amplified PWM signal for the search operation is held in an appropriate value. This allows the pickup transfer drive motor 14 to be driven with an appropriate power conversion efficiency. Also, in a reproducing condition of the optical disc 11, the first power supply voltage V1 is applied to the BTL drive circuit 21. At that time, the peak level of the amplified PWM signal outputted from the BTL drive circuit 21 is restrained in a relatively low level, i.e., the first power supply voltage V1. Thereby the duty ratio of the amplified PWM signal for the normal disc reproducing operation is increased. This allows the pickup transfer drive motor 14 to be driven in the highly power conversion efficiency. The duty ratio of the PWM signal for the normal disc reproducing operation can be set to the duty ratio of the PWM signal for the search operation by adjusting the first and second power supply voltage V1 and V2 to each other.

Therefore, according to the embodiment as described above, the optical pickup control system for the compact disc player can drive the optical pickup at the high transfer speed with the higher effective voltage in the search operation. And also the system can drive the optical pickup at the low transfer speed with the sufficient power conversion efficiency in the normal disc reproducing operation. As a result, the compact disc player can operate with the relatively small power consumption.

Figure 6:
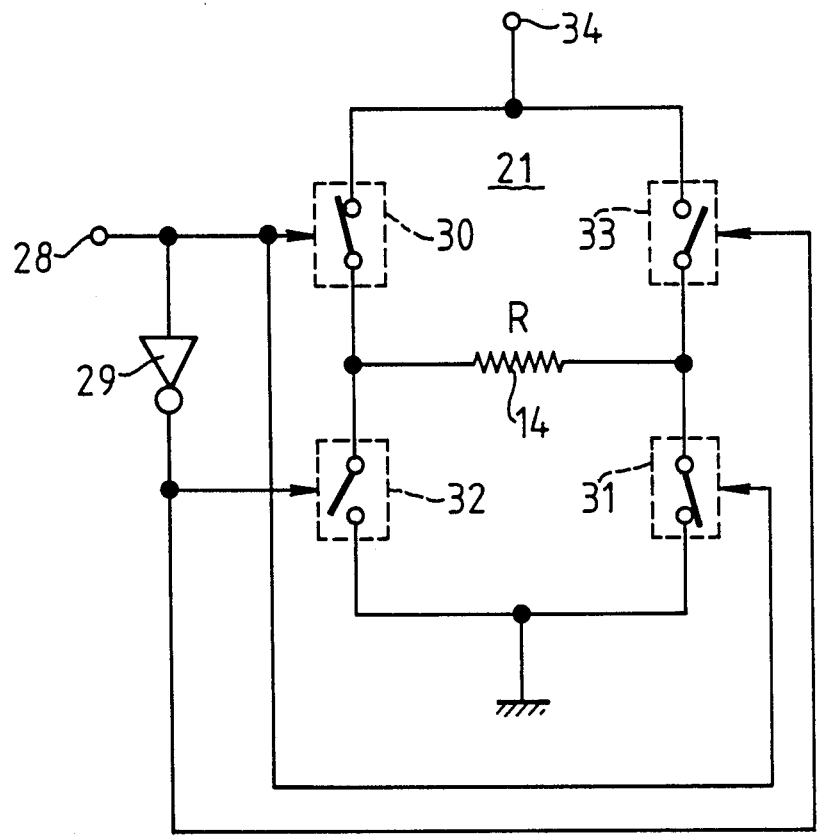
FIG. 6 is a circuit diagram showing an example of the balanced transformerless (BTL) drive circuit of the embodiment of FIG. 4.

FIG. 6 shows the detailed construction of the BTL drive circuit 21 in FIG. 4. The PWM signal outputted from the PWM conversion circuit 19 applied to a signal input terminal 28. The signal input terminal 28 is directly connected to control input terminals of first and second switches 30 and 31. Further the signal input terminal 28 is connected to control input terminals of third and fourth switches 32 and 33 through an inverter 29. Thus, the PWM signals applied to the third and fourth switches 32 and 33 are opposite in phase to the PWM signals applied to the first and second switches 30 and 31. The first and third switches 30 an 32 are connected in series between a power supply voltage input terminal 34 which is connected to the selectable power supply circuit 22 and a ground terminal. The second and fourth switches 31 an 33 also are connected in series between the power supply voltage input terminal 34 and a ground terminal. Between a connection node of the first and third switches 30 and 32 and another connection node of the second and fourth switches 31 and 33, the pickup transfer drive motor 14 which is symbolized by a load having a resistance R in the drawing is connected. Then, the power supply voltage V1 or V2 on the power supply input terminal 34 is applied to the load 14, i.e., the pickup transfer drive motor 14 at the duty ratio corresponding to the PWM signal converted from the tracking error signal TE or the search operation command signal as described before.

Figure 7:
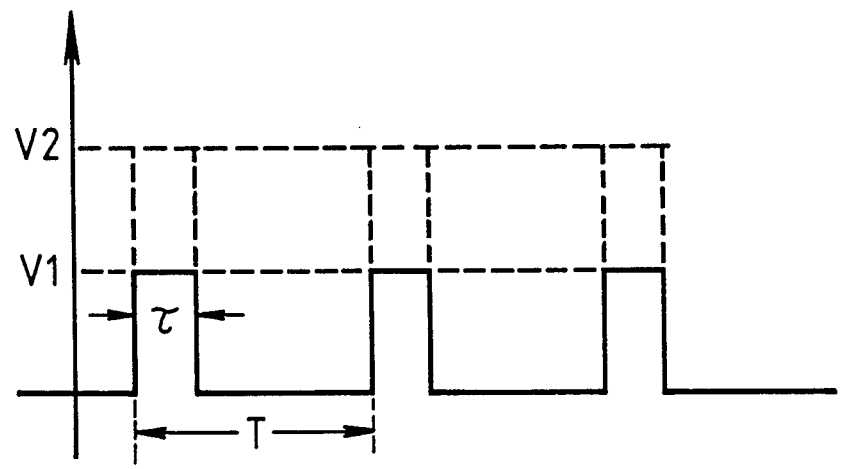
FIG. 7 is a graph showing waveforms of the PWM signals for describing the operation of the embodiment of FIG. 4.

Referring now to FIG. 6 and 7, the operation of the BTL drive circuit 21 will be described. FIG. 7 shows waveform graphs of output signals obtained on the load 14. For example, when the power supply voltage V1 is applied to the power supply input terminal 34, the PWM signal with the peak level V1 as shown by the solid line in FIG. 7 is applied to the load resistance R. Also, when the power supply voltage V2 is applied to the power supply input terminal 34, the PWM signal of the peak value V2 as shown by the broken line in FIG. 7 is applied to the load 14. As will be clearly understood form FIG. 7, even if the peak level of the PWM signal is changed between the voltages V1 and V2, the duty ratio of the PWM signals is left unchanged. Therefore, the dynamic range of the BTL drive circuit 21 can be enlarged and its gain can be increased. This results in the transfer control of the optical pickup 13 becoming more effective both at the relatively low speed in the normal disc reproducing operation and at the relatively high speed in the search operation.

Figure 8:
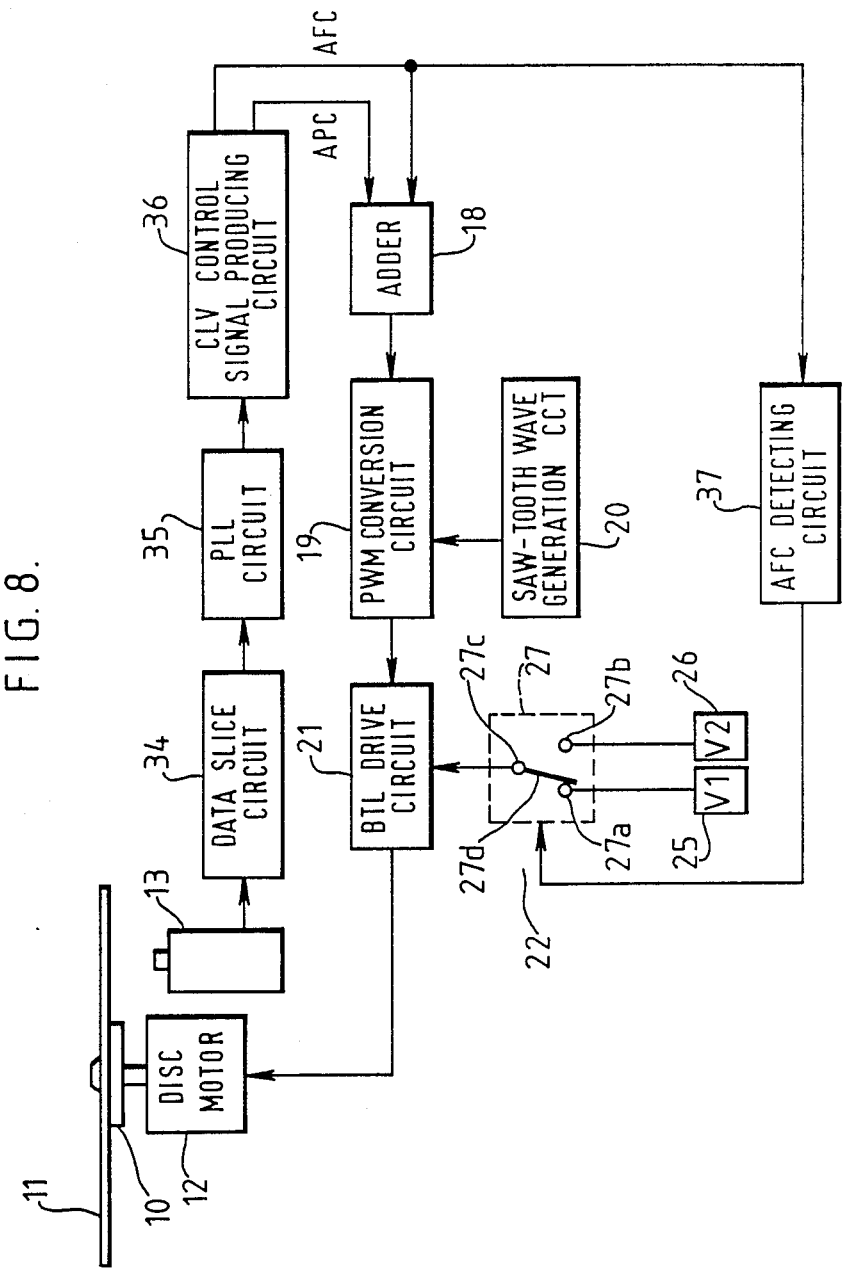
FIG. 8 is a block diagram showing a second embodiment of a control system for disc reproducing apparatus according to the present invention.

Referring now to FIG. 8, a second embodiment of the present invention will described. The second embodiment shown in FIG. 8 also the compact disc player according to the present invention and is different from the first embodiment shown in FIG. 4 in followings. Thus, the differences from the first embodiment will be described here for the simplicity of explanation. In FIG. 8, a reproduced signal outputted from the optical pickup 13 is applied to a data slice circuit 34 and therein the signal is shaped its waveform to a rectangular pulse. The signal outputted from the data slice circuit 34 is applied to a phase looked loop (PLL) circuit 35 and therein a synchronization signal is extracted from the reproduced signal. The synchronization signal outputted from the PLL circuit 35 is applied to a CLV servo control signal producing circuit 36 and therein an automatic frequency control (AFC) signal for a CLV rotation frequency servo control of the disc rotation drive motor 12 and an automatic phase control (APC) signal for a CLV rotation phase servo control of the disc rotation drive motor 12 are produced. The AFC and the APC signals produced from the CLV servo control signal producing circuit 36 is applied to the PWM conversion circuit 19. Further an abnormal AFC detection circuit 37 is connected between the CLV servo control signal producing circuit 36 and the selectable power supply circuit 22.

Now the operation of the second embodiment as shown in FIG. 8 will be described. During the normal disc reproducing operation, the AFC signal outputted from the CLV servo control signal producing circuit 36 has a relatively low value so that the disc rotation drive motor 12 rotates with a relatively small power gain. At a start of the disc reproducing operation, the PLL circuit 35 fails to extract the synchronization signal. At that time, the AFC signal produced from the CLV servo control signal producing circuit 36 increases to an abnormal value larger than the value in the normal disc reproducing operation. The abnormal AFC detecting circuit 37 detects the abnormal AFC signal and then controls the selectable power supply circuit 22. The selectable power supply circuit 22 then applies the higher second power supply voltage V2 to the BTL drive circuit 21. As a result, the disc rotation drive control system of the second embodiment according to the present invention can bring the disc rotation motor 12 in the prescribed CLV rotation state with the high power conversion efficiency.

Figure 9:
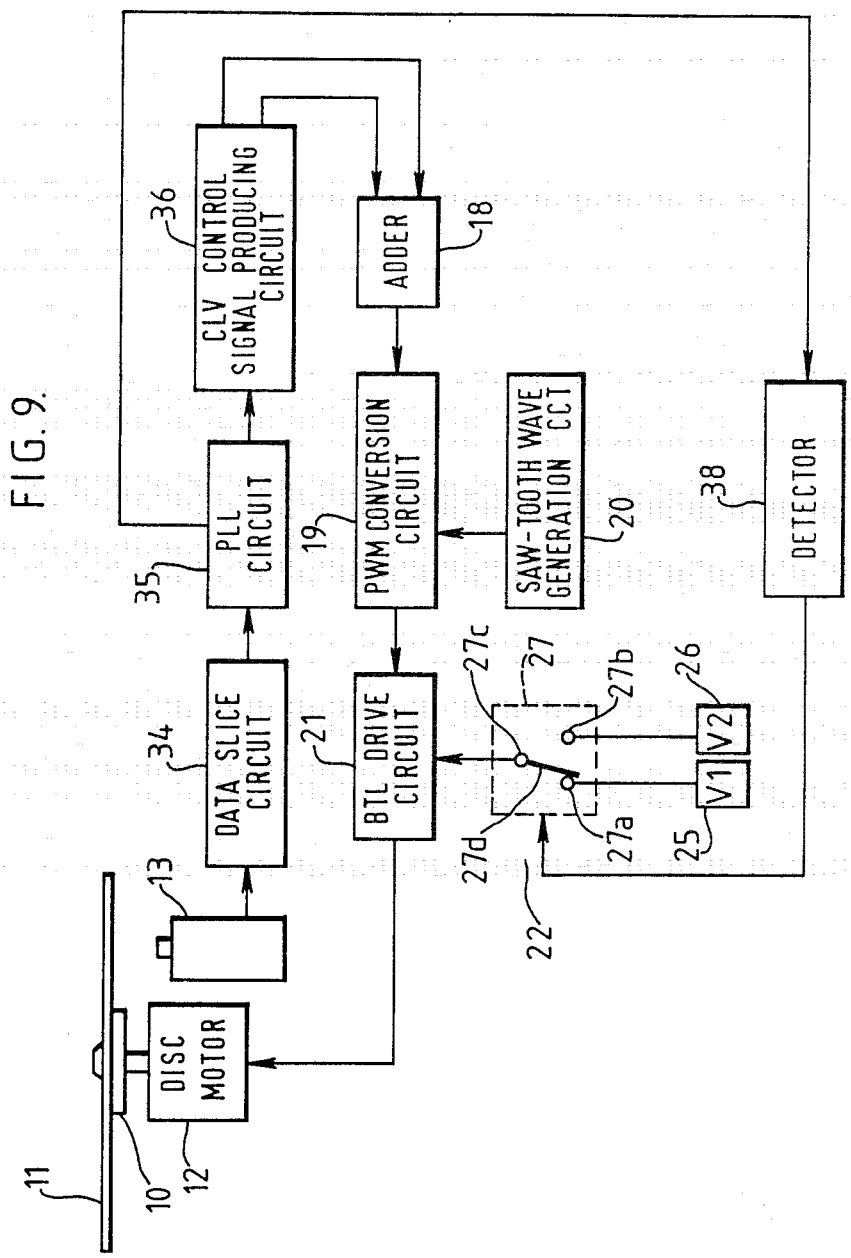
FIG. 9 is a block diagram showing a third embodiment of a control system for disc reproducing apparatus according to the present invention.

Referring now to FIG. 9, a third embodiment of the present invention will described. The third embodiment shown in FIG. 9 is also the compact disc player according to the present invention and is different from the second embodiment shown in FIG. 8 in followings. Thus, the differences from the second embodiment will be described here for the simplicity of explanation. In FIG. 9, an abnormal synchronization detection circuit 38 is connected between the PLL circuit 35 and the selectable power supply circuit 22.

Now the operation of the third embodiment as shown in FIG. 9 will be described. During the normal disc reproducing operation, the synchronization signal outputted from the PLL circuit 35 has a relatively low value so that the disc rotation drive motor 12 rotates with a relatively small power gain. At a start of the disc reproducing operation, the PLL circuit 35 fails to extract the synchronization signal. At that time, the synchronization signal produced from the PLL circuit 35 increases to an abnormal value larger than the value in the normal disc reproducing operation. The abnormal synchronization detecting circuit 38 detects the abnormal synchronization signal and then controls the selectable power supply circuit 22. The selectable power supply circuit 22 then applies the higher second power supply voltage V2 to the BTL drive circuit 21. As a result, the disc rotation drive control system of the second embodiment according to the present invention can bring the disc rotation motor 12 in to the prescribed CLV rotation state with the high power conversion efficiency.

Figure 10:
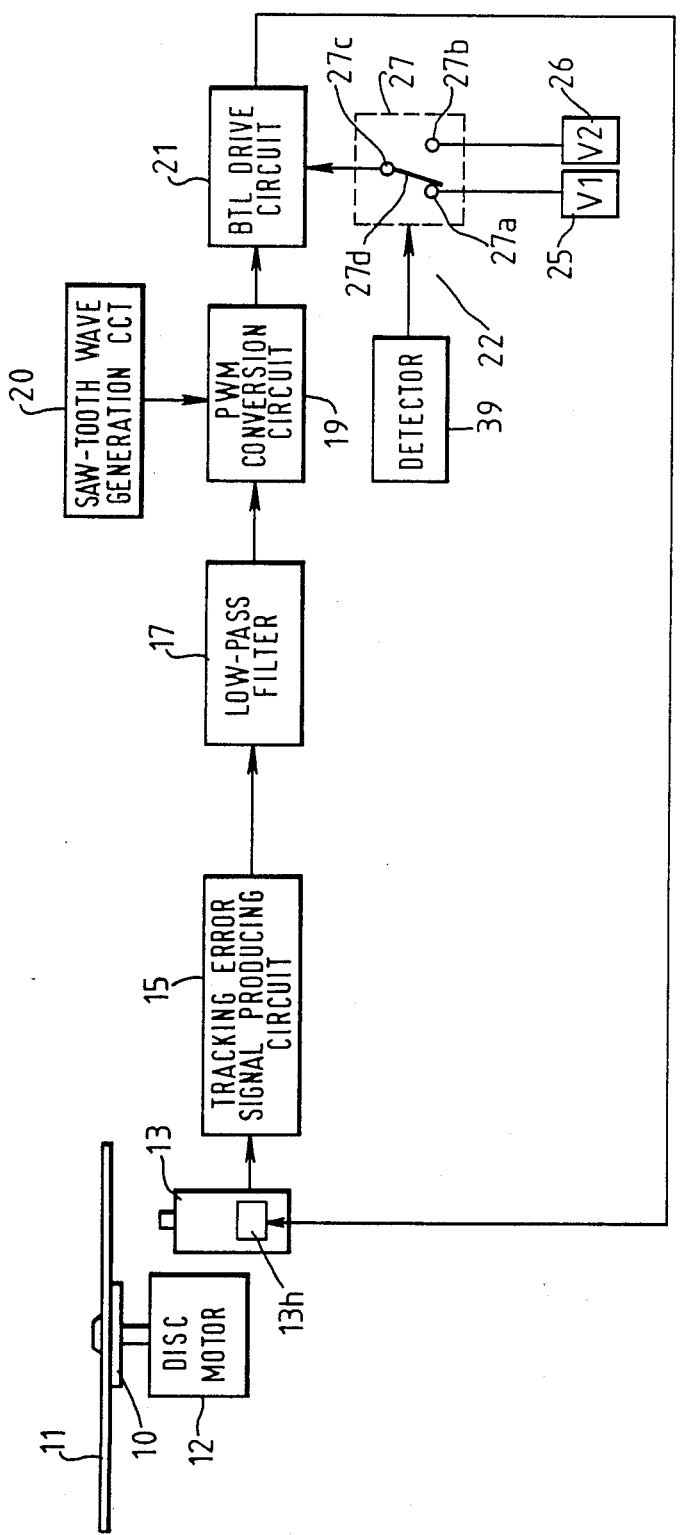
FIG. 10 is a block diagram showing a fourth embodiment of a control system for disc reproducing apparatus according to the present invention.

Referring now to FIG. 10, a fourth embodiment of the present invention will described. The fourth embodiment shown in FIG. 10 is also the compact disc player according to the present invention and is different from the first embodiment shown in FIG. 4 in followings. Thus, the differences from the first embodiment will be described here for the simplicity of explanation. In FIG. 10, a detector 39 responsive to a mechanical shock is provided and connected to the selectable power supply circuit 22.

Now the operation of the fourth embodiment as shown in FIG. 10 will be described. During the normal disc reproducing operation, the tracking error signal TE outputted from the tracking error signal signal producing circuit 15 has a relatively low value. At that time, the tracking actuator 13h shifts the objective lens 13f in the radial direction of the optical disc 11 at the relatively slow speed so that the light spot of the laser beam LB well follows the prescribed track. When the compact disc player, especially the optical pickup 13 receives a mechanical shock, there happens that the tracking actuator 13h fails to place the light spot on the prescribed track location. The light spot then can be easily departed a relatively long distance from the prescribed track. At that time, the detector 39 produces a detection signal in response to the mechanical shock. The detection signal is applied to the selectable power supply circuit 22. The selectable power supply circuit 22 then applies the higher second power supply voltage V2 to the BTL drive circuit 21. As a result, the PWM signal converted from, the tracking error signal TE is amplified to the level of the second power supply voltage V2. The tracking actuator 13h is then driven by the PWM signal which has a higher voltage than that in the normal tracking operation. As a result, the tracking actuator 13h can quickly shift the objective lens so that the light spot of the laser beam LB restores on the prescribed track with the high power conversion efficiency.

Figure 11:
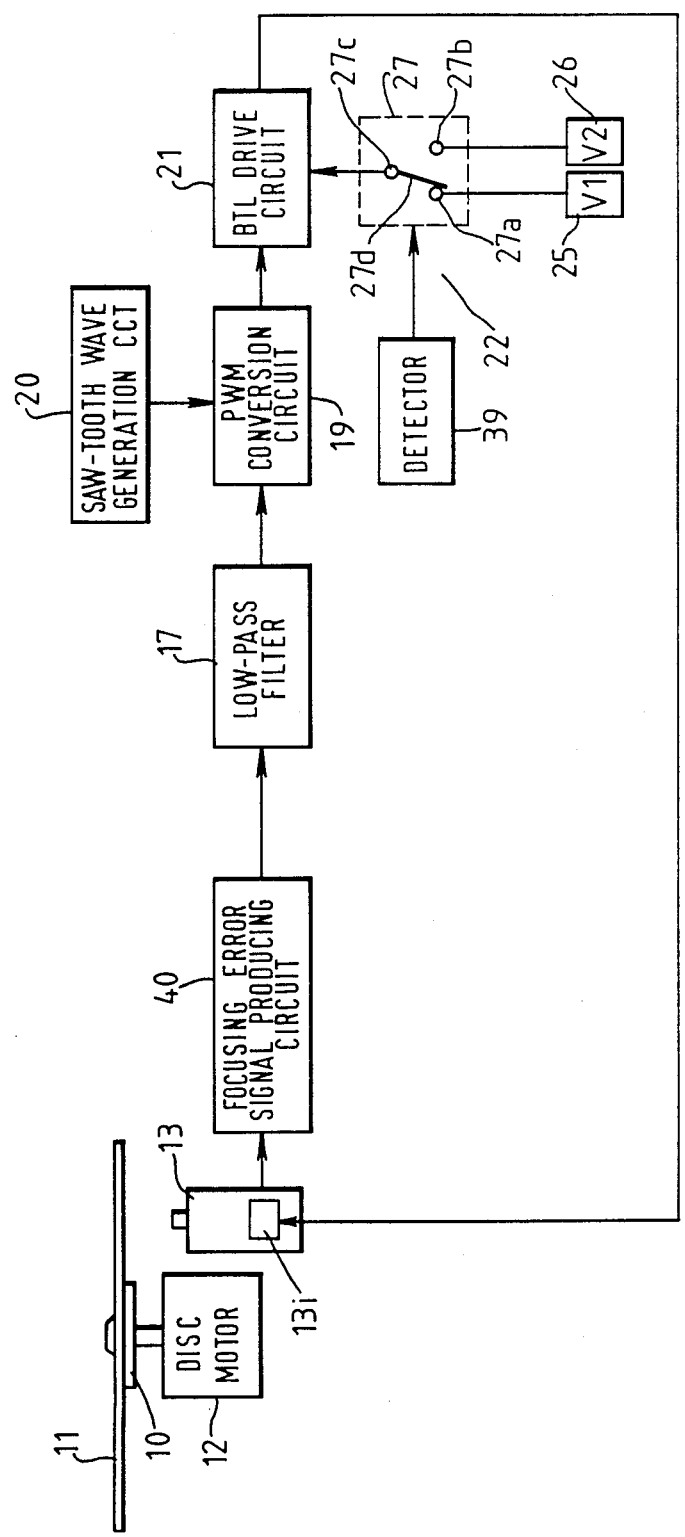
FIG. 11 is a block diagram showing a fifth embodiment of a control system for disc reproducing apparatus according to the present invention.

Referring now to FIG. 11, a fifth embodiment of the present invention will described. The fifth embodiment shown in FIG. 11 is also the compact disc player according to the present invention and is different from the fourth embodiment shown in FIG. 10 in followings. Thus, the differences from the fourth embodiment will be described here for the simplicity of explanation. In FIG. 11, a focusing error signal producing circuit 40 is provided in place of the tracking error signal producing circuit 15 in FIG. 10. Further the BTL driven circuit 21 is connected to the focusing actuator 13i (see FIG. 5).

Now the operation of the fifth embodiment as shown in FIG. 11 will be described. During the normal disc reproducing operation, a focusing error signal FE outputted from the focusing error signal signal producing circuit 40 has a relatively low value so that the focusing actuator 13i shifts the objective lens 13f in the longitudinal direction of the surface of the optical disc 11 at the relatively slow speed so that the light spot of the laser beam LB is well focused to the surface of the optical disc 11. When the compact disc player, especially the optical pickup 13 receives a mechanical shock, there happens that the focusing actuator 13i fails to focus the light spot to the surface of the optical track 11. The light spot then can be easily outfocused a relatively long distance from the surface of the optical track 11. At that time, the detector 39 produces a detection signal in response to the mechanical shock. The detection signal is applied to the selectable power supply circuit 22. The selectable power supply circuit 22 then applies the higher second power supply voltage V2 to the BTL drive circuit 21. As a result, the PWM signal converted from the focusing error signal FE is amplified to the level of the second power supply voltage V2. The focusing actuator 13i is then driven by the PWM signal which has a higher voltage than that in the normal focusing operation. As a result, the focusing actuator 13i can quickly shift the objective lens so that the light spot of the laser beam LB is focused on the surface of the optical disc 11 with the high power conversion efficiency.

Figure 12:
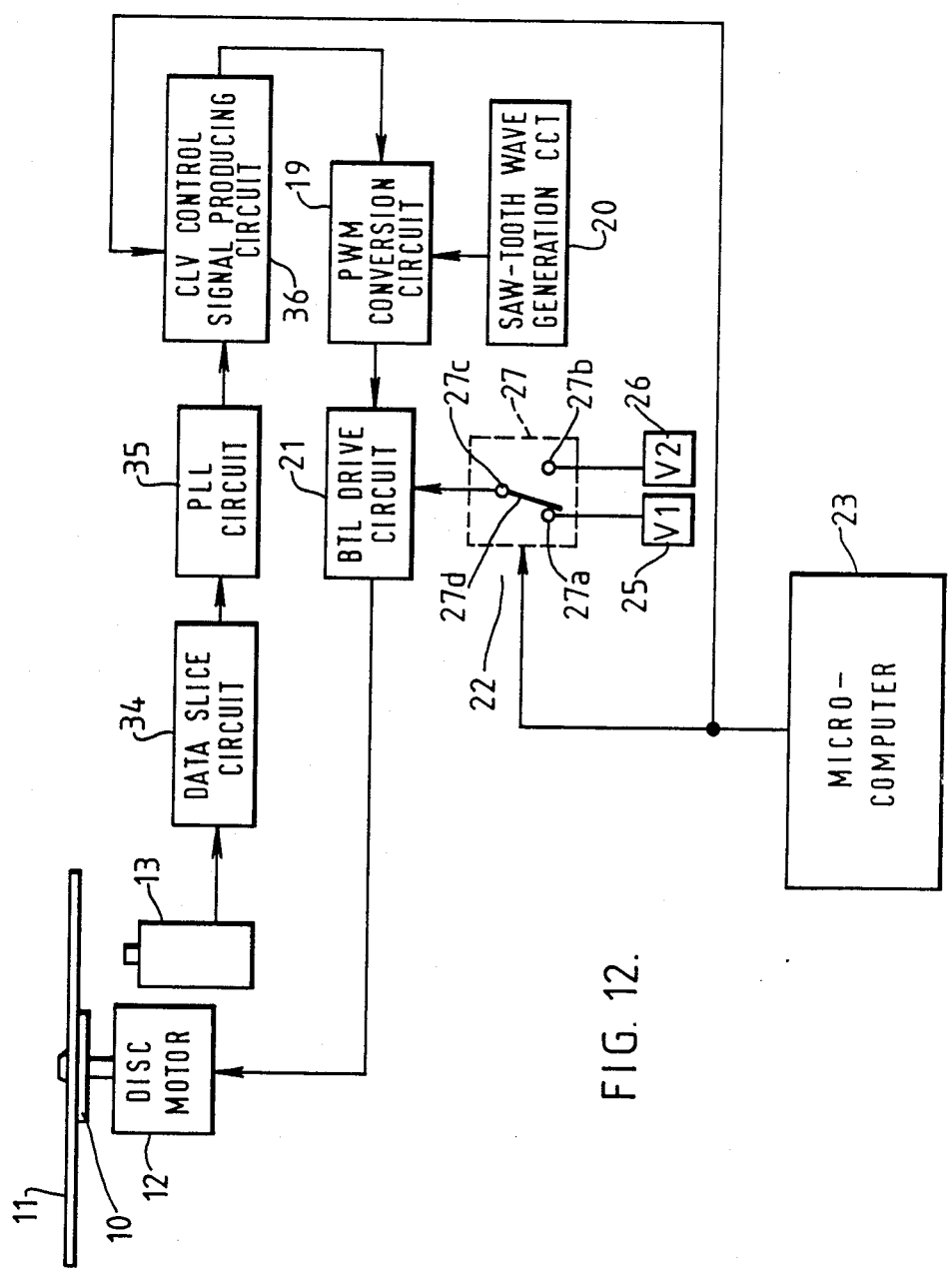
FIG. 12 is a block diagram showing a sixth embodiment of a control system for disc reproducing apparatus according to the present invention.

Referring now to FIG. 12, a sixth embodiment of the present invention will described. The sixth embodiment shown in FIG. 12 is also the compact disc player according to the present invention and is different from the second embodiment shown in FIG. 8 in followings. Thus, the differences from the second embodiment will be described here for the simplicity of explanation. In FIG. 12, the microcomputer 23 is connected to the CLV servo control signal producing circuit 36 as well as the selectable power supply circuit 22.

Now the operation of the sixth embodiment as shown in FIG. 12 will be described. During the normal disc reproducing operation, the synchronization signal outputted from the PLL circuit 35 has a relatively low value so that the disc rotation drive motor 12 rotates with a relatively small power gain. When a reproducing stop operation is commanded, the microcomputer 23 produces a a stop operation command signal of a high (H) level signal. The stop operation command signal is applied to both the CLV servo control signal producing circuit 36 and the selectable power supply circuit 22. The CLV servo control signal producing circuit 36 produces a signal which operates to damp the the rotation of the disc drive motor 12. The damping signal is converted to the PWM signal in the PWM conversion circuit 19. While the selectable power supply circuit 22 applies the second power supply voltage V2 to the BTL drive circuit 21. Therefore, the PWM signal converted from the damping signal is amplified its peak level to the second power supply voltage V2 in the BTL drive circuit 21. The amplified PWM signal converted from the damping signal is applied to the disc rotation drive motor 12 so that the disc rotation drive motor 12 is damped its rotation quickly. As a result, the disc reproducing stop control system of the sixth embodiment according to the present invention can bring the disc rotation drive motor 12 or the turntable 10 into stop condition quickly and with the high power conversion efficiency.

Figure 13:
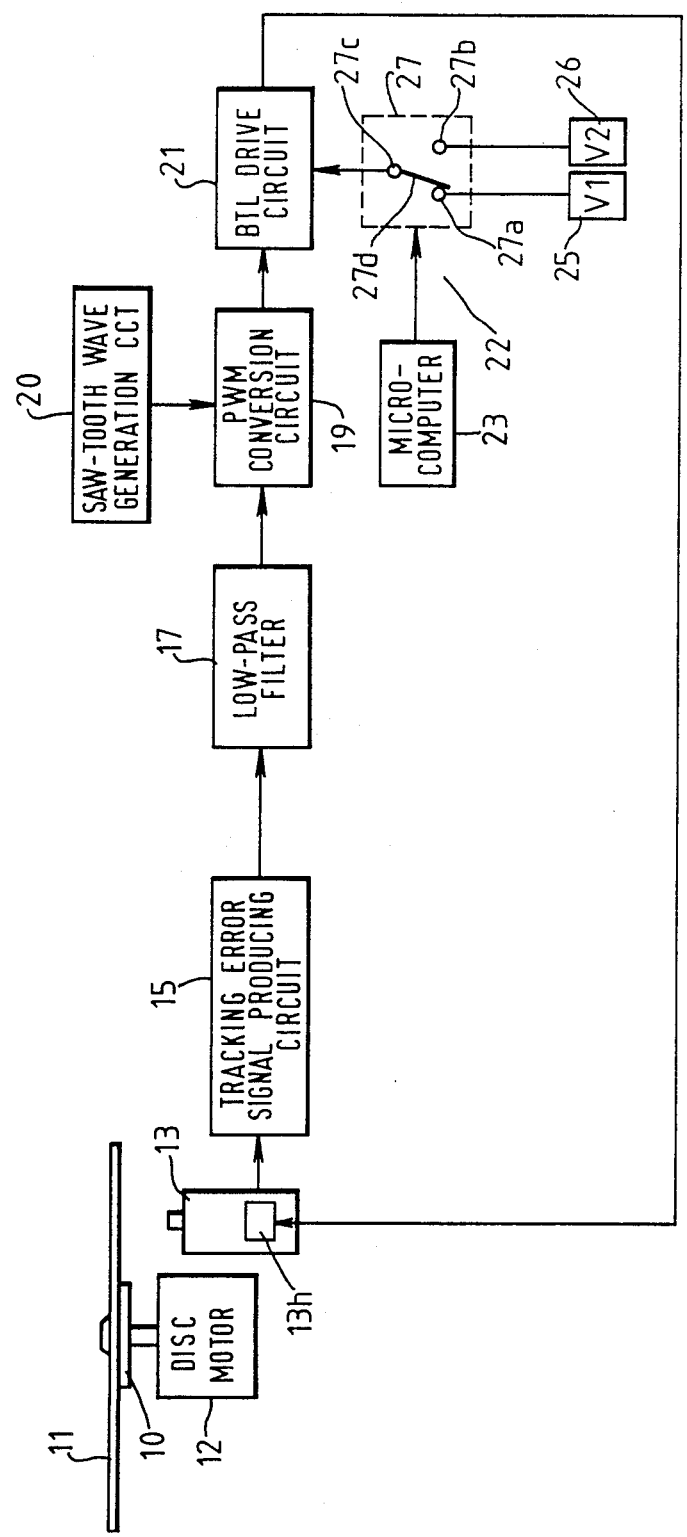
FIG. 13 is a block diagram showing a seventh embodiment of a control system for disc reproducing apparatus according to the present invention.

Referring now to FIG. 13 a seventh embodiment of the present invention will described. The seventh embodiment shown in FIG. 13 is also the compact disc player according to the present invention and is different from the first embodiment shown in FIG. 4 in followings. Thus, the differences from the first embodiment will be described here for the simplicity of explanation. In FIG. 13, the BTL circuit 21 is connected to the tracking actuator 13h of the optical pickup 13. While, the microcomputer 23 is connected to only the selectable power supply circuit 22.

Now the operation of the seventh embodiment as shown in FIG. 13 will be described. During the normal disc reproducing operation, the tracking error signal TE outputted from the tracking error signal producing circuit 15 has a relatively low value. At that time, the tracking actuator 13h shifts the objective lens 13f in the radial direction of the optical disc 11 at the relatively slow speed so that the light spot of the laser beam LB well follows the prescribed track. When a track jump for a relatively short distance is commanded to the tracking actuator 13h for, e.g., a short distance search operation, a short distance search operation command signal corresponding to the distance and the direction for moving the tracking actuator 13h to a prescribed position on the optical disc 11 at a high speed is generated from the microcomputer 23. The short distance search operation command signal is applied to the selectable power supply circuit 22. The selectable power supply circuit 22 thus applies the second power supply voltage V2 to the BTL drive circuit 21 so that the PWM signal converted from the tracking error signal TE is amplified to the second power supply voltage V2. Thus, the tracking actuator 13h kicks the objective lens 13f in the radial direction of the optical disc 11 at a relatively fast speed. As a result, the objective lens 13f is shifted at the relatively fast speed corresponding to the short distance search operation in the radial direction of the optical disc 11 to perform the short distance track jump.

Figure 14:
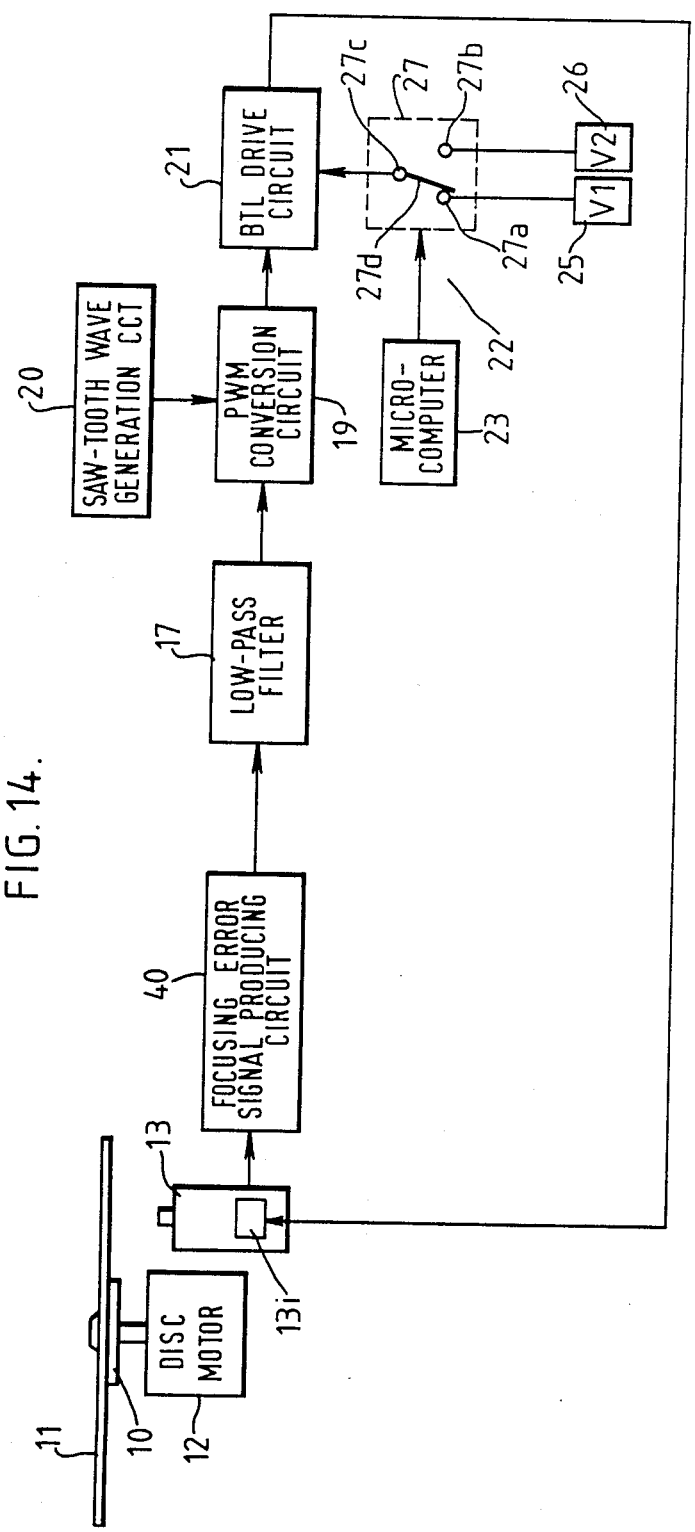
FIG. 14 is a block diagram showing a eighth embodiment of a control system for disc reproducing apparatus according to the present invention.

Referring now to FIG. 14, a eighth embodiment of the present invention will described. The eighth embodiment shown in FIG. 14 is also the compact disc player according to the present invention and is different from the seventh embodiment shown in FIG. 13 in followings. Thus, the differences from the first embodiment will be described here for the simplicity of explanation. In FIG. 14, a focusing error signal producing circuit 40 is provided in place of the tracking error signal producing circuit 15 in FIG. 13. Further the BTL drive circuit 21 is connected to the focusing actuator 13i (see FIG. 5).

Now the operation of the eighth embodiment as shown in FIG. 14 will be described. In the reproducing stop condition, the objective lens 13f is settled at a prescribed position. When the reproducing operation is commanded, the focusing actuator 13i shifts the objective lens 13f in the perpendicular direction to the surface of the optical disc 11 toward a the proper position so that the light spot of the laser beam LB is well focused on the surface of the optical disc 11. Until the proper focus is obtained, the focusing error signal producing circuit 40 produces the focusing error signal FE of a relatively high level. the high level focusing error signal FE is converted to the PWM signal in the PWM conversion circuit 19 and the applied to the BTL drive circuit 21. While the microcomputer 23 produces the reproducing operation command signal of a high level. The reproducing operation command signal is applied to the selectable power supply circuit 22. The selectable power supply circuit 22 thus applies the second power supply voltage V2 to the BTL drive circuit 21 so that the PWM signal converted from the focusing error signal FE is amplified to the second power supply voltage V2. Thus, the focusing actuator 13i kicks the objective lens 13f in the perpendicular direction to the surface of the optical disc 11 at a relatively fast speed. As a result, the objective lens 13f is shifted quickly and with the high power conversion efficiency to the proper position so that the light spot of the laser beam LB is well focused on the surface of the optical disc 11.

Figure 15:
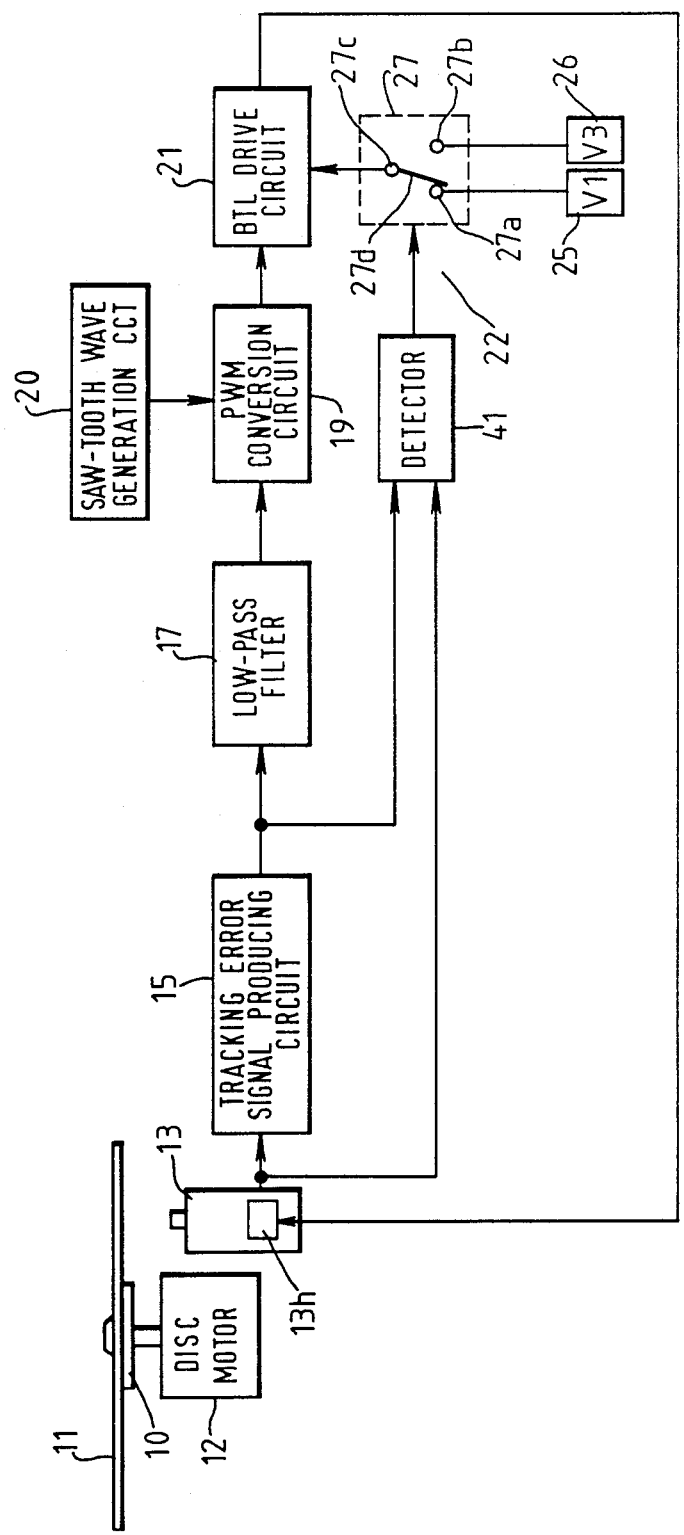
FIG. 15 is a block diagram showing a ninth embodiment of a control system for disc reproducing apparatus according to the present invention.

Referring now to FIG. 15, a ninth embodiment of the present invention will be described. The ninth embodiment shown in FIG. 15 is also the compact disc player according to the present invention and is different from the fourth embodiment shown in FIG. 10 in followings. Thus, the differences from the first embodiment will be described here for the simplicity of explanation. In FIG. 15, a detector 41 is connected to the optical pickup 13 to receive the reproduced signal. The detector 41 is further connected to the tracking error producing circuit 15 to receive the tracking error signal TE. The detector 41 is connected its output terminal to the selectable power supply circuit 22. The selectable power supply circuit 22 has a third power supply source 42 in place of the second power supply source 26 as well as the first power supply source 25. The third power supply source 42 produces a third power supply voltage V3 which is lower than the first power supply voltage V1.

Now the operation of the ninth embodiment as shown in FIG. 15 will be described. During the normal disc reproducing operation, the optical pickup 13 produces the reproduced signal corresponding to the recorded information of the optical disc 11. While, the tracking error signal signal producing circuit 15 produces the tracking error signal TE of a relatively low level. In the above condition, the selectable power supply circuit 22 applies the first power supply voltage V1 to the BTL drive circuit 21. When the optical pickup 13 traces an inferior portion of the optical disc 11 such as a portion damaged by dust or a flaw, the optical pickup 13 fails to produce the reproduced signal or produces the reproduced signal of a very high level. At that time, the tracking error signal producing circuit 15 produces the tracking error signal TE of a relatively high level. Then, the detector 41 produces a high level signal in response to both the high level tracking error signal TE and the lack of the reproduced signal or the reproduced signal of the the excessive level. The high level level signal is applied to the selectable power supply circuit 22. The selectable power supply circuit 22 then applies the third power supply voltage V3 to the BTL drive circuit 21. As a result, the PWM signal converted from the tracking error signal TE is amplified its peak level to the level of the third power supply voltage V3. The tracking actuator 13h is then driven by the PWM signal which has a lower voltage than that in the normal tracking operation. The tracking actuator 13h is then decreased its power gain to drive. As a result, the objective lens 13f is held in the position that the tracking actuator 13h has placed the light spot of the laser beam LB to the prescribed track before tracing the inferior portion. Thus, the tracking actuator control according to the embodiment can operate with the high power conversion efficiency at the normal reproducing operation as well as at the tracing of the inferior portion of the optical disc 11.

Figure 16:
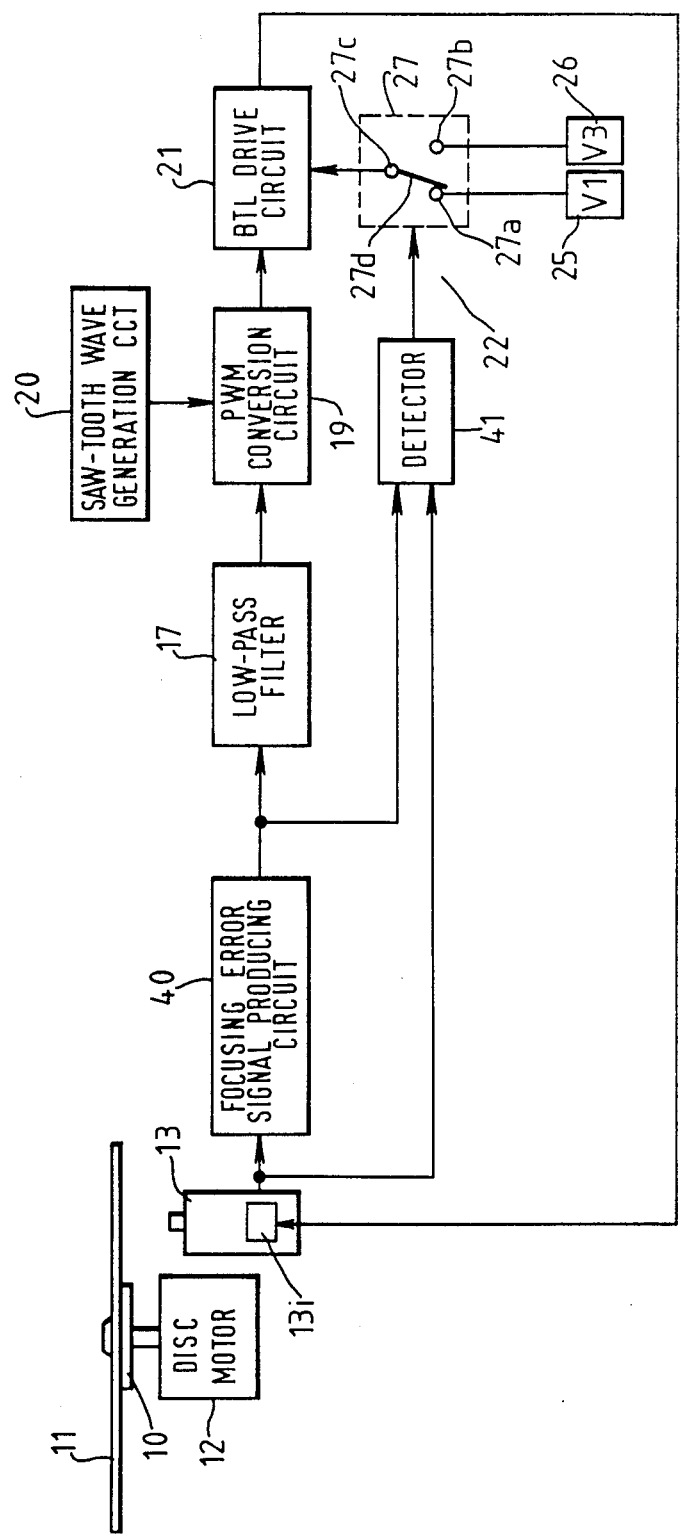
FIG. 16 is a block diagram showing a tenth embodiment of a control system for disc reproducing apparatus according to the present invention.

Referring now to FIG. 16, a tenth embodiment of the present invention will described. The tenth embodiment shown in FIG. 16 is also the compact disc player according to the present invention and is different from the ninth embodiment shown in FIG. 15 in followings. Thus, the differences from the first embodiment will be described here for the simplicity of explanation. In FIG. 16, a focusing error signal producing circuit 40 is provided in place of the tracking error signal producing circuit 15 in FIG. 15. Further the BTL drive circuit 21 is connected to the focusing actuator 13i (see FIG. 5).

Now the operation of the tenth embodiment as shown in FIG. 16 will be described. During the normal disc reproducing operation, the optical pickup 13 produces the reproduced signal corresponding to the recorded information of the optical disc 11. While, the focusing error signal signal producing circuit 40 produces the focusing error signal FE of a relatively low level. In the above condition, the selectable power supply circuit 22 applies the first power supply voltage V1 to the BTL drive circuit 21. When the optical pickup 13 traces the inferior portion of the optical disc 11, the optical pickup 13 fails to produce the reproduced signal or produces the reproduced signal of a very high level. At that time, the focusing error signal producing circuit 15 produces the tracking error signal TE of a relatively high level. Then, the detector 41 produces a high level signal in response to both the high level tracking error signal TE and the lack of the reproduced signal or the reproduced signal of the excessive level. The high signal is applied to the selectable power supply circuit 22. The selectable power supply circuit 22 then applies the third power supply voltage V3 to the BTL drive circuit 21. As a result, the PWM signal converted from the focusing error signal FE is amplified its peak level to the level of the third power supply voltage V3. The focusing actuator 13i is then driven by the PWM signal which has a lower voltage than that in the normal focusing operation. The focusing actuator 131 is then decreased its power gain to drive. As a result, the objective lens 13f is held in the position that the focusing actuator 13i has focused the light spot of the laser beam LB to the surface of the optical disc 11 before tracing the inferior portion. Thus, the focusing actuator control according to the embodiment can operate with the high power conversion efficiency at the normal reproducing operation as well as at the tracing of the inferior portion of the optical disc 11.

The present invention is not limited to the embodiment described above, and it is to be understood that changes and variations may be made without departing from the spirit of the present invention.

As described above in detail, according to the present invention, it is possible to provide an extremely preferable control device of a moving device such as disc rotation drive motors, optical pickup transfer drive motors, tracking actuators and focusing actuators with a high power conversion efficiency in both a slow speed or a high speed moving condition and devise a low power consumption.

What is claimed is:

1. A control system for an optical disc information reproducing apparatus in which information data stored in an optical disc is read out during a rotation of the optical disc by a light spot of a light beam, the system comprising:
    means for producing the light beam;
    means for relatively moving the optical disc and the light spot of the light beam;
    means responsive to the light beam reflected from the optical disc for reproducing the information data from the optical disc during the rotation of the optical disc, the reproducing means producing an electrical signal corresponding to the information data;
    means for deriving a servo control signal from the reproduced signal;
    means for modulating the servo control signal to a pulse width modulation (PWM) signal;
    means for amplifying the PWM signal;
    means for producing a response control signal,
    means responsive to the amplifying means for driving the moving means; and
    means for applying the amplifying means with a power supply voltage which is changeable in response to the response control signal.

2. The control system of claim 1, wherein the power supply voltage applying means includes a first power supply source for applying a first power supply source voltage, a second power supply source for applying a second power supply source voltage which is higher than the first power supply source voltage and a switch means responsive to the control signal for selecting the first or second power supply source to the amplifying means.

3. The control system of claim 2, wherein the amplifying means includes a balanced transformerless (BTL) circuit which operates to shift the peak level of the PWM signal to the selected voltage of the first and second power supply voltages.

4. The control system of claim 3, wherein the BTL circuit includes a power supply voltage input terminal connected to the power supply voltage applying means, a ground terminal connected to a reference potential source, a pair of noninversed and inversed output terminals between which the driving means is connected, a first controllable switch means connected between the power supply voltage input terminal and the noninversed output terminal, a second controllable switch means connected between the inversed output terminal and the ground terminal, a third controllable switch means connected between the power supply voltage input terminal and the inversed output terminal and a fourth controllable switch means connected between the noninversed output terminal and the ground terminal, a signal input terminal connected to directly to control terminals of the first and second controllable switch means and to control terminals of the third and fourth controllable switch means through an inverter.

5. The control system of claim 2, wherein the light beam producing means includes a laser device for producing a laser beam, and wherein the information data reproducing means includes a photoelectric transducer device responsive to the laser beam reflected from the optical disc for converting the optical information carried in the reflected laser beam to an electrical information.

6. The control system of claim 5, wherein the moving means includes means for mounting the laser device and the photoelectric transducer device together.

7. The control system of claim 6, wherein the laser device, the photoelectric transducer device and the mounting means constitute a pickup device.

8. The control system of claim 7, wherein the driving means includes means for transferring the pickup device in relative to the optical disc.

9. The control system of claim 8, wherein the servo control signal deriving means includes a circuit for producing a tracking error signal as the servo control signal, the response control signal producing means includes an operation control circuit for producing a command signal as the response control signal to command the transferring means a fast speed transfer operation, and the power supply voltage applying means applies the second power supply voltage to the BTL circuit in response to the fast speed transfer command signal.

10. The control system of claim 9, wherein the transferring means includes a pickup transfer drive motor.

11. The control system of claim 10, wherein the motor is a linear motor.

12. The control system of claim 5, wherein the moving means includes means for rotatably supporting the optical disc.

13. The control system of claim 12, wherein the servo control signal deriving means includes a phase locked loop (PLL) circuit for producing an automatic frequency control (AFC) signal to be used for rotating the disc supporting means at a prescribed speed as the servo control signal, the response control signal producing means includes a circuit for detecting whether the AFC signal exceeds a predetermined level or not, and the power supply voltage applying means applies the second power supply voltage to the BTL circuit in response to the AFC level detecting circuit.

14. The control system of claim 13, wherein the disc supporting means is a turntable.

15. The control system of claim 14, wherein the driving means is a motor for rotating the turntable.

16. The control system of claim 12, wherein the servo control signal deriving means includes a phase locked loop (PLL) circuit for producing an automatic frequency control (AFC) signal to be used for rotating the disc supporting means at a prescribed speed as the servo control signal and a synchronization signal, the response control signal producing means includes a circuit for detecting whether the synchronization signal is out of a prescribed pulse duration range or not, and the power supply voltage applying means applies the second power supply voltage to the BTL circuit in response to the synchronization signal duration detecting circuit.

17. The control system of claim 16, wherein the disc supporting means is a turntable.

18. The control system of claim 17, wherein the driving means is a motor for rotating the turntable.

19. The control system of claim 12, wherein the servo control signal deriving means includes a phase locked loop (PLL) circuit for producing an automatic frequency control (AFC) signal to be used for rotating the disc supporting means at a prescribed speed as the servo control signal, the response control signal producing means includes an operation control circuit for producing a command signal as the response control signal to command the driving means a stop operation, and the power supply voltage applying means applies the second power supply voltage to the BTL circuit in response to the stop command signal.

20. The control system of claim 19, wherein the disc supporting means is a turntable.

21. The control system of claim 20, wherein the driving means is a motor for rotating the turntable.

22. The control system of claim 7, wherein the moving means includes an optical lens for applying the laser beam to the optical disc.

23. The control system of claim 22, wherein the servo control signal deriving means includes a circuit for producing a tracking error signal as the servo control signal, the response control signal producing means includes means for responsive to a mechanical shock, and the power supply voltage applying means applies the second power supply voltage to the BTL circuit in response to the mechanical shock detecting means.

24. The control system of claim 23, wherein the driving means includes means for shifting the optical lens (13f) in the direction perpendicular to the laser beam.

25. The control system of claim 24, wherein the perpendicular direction shifting means is a tracking actuator.

26. The control system of claim 23, wherein the driving means includes means for shifting the optical lens in the direction longitudinal to the laser beam.

27. The control system of claim 26, wherein the longitudinal direction shifting means is a focusing actuator.

28. The control system of claim 22, wherein the servo control signal deriving means includes a circuit for producing a tracking error signal as the servo control signal, the response control signal producing means includes an operation control circuit for producing a command signal as the response control signal to command the optical lens a fast speed shift operation in the direction perpendicular to the laser beam, and the power supply voltage applying means applies the second power supply voltage to the BTL circuit in response to the fast speed perpendicular direction shift operation command signal.

29. The control system of claim 28, wherein the driving means includes means for shifting the optical lens in the direction perpendicular to the laser beam.

30. The control system of claim 29, wherein the perpendicular direction shifting means is a tracking actuator.

31. The control system of claim 22, wherein the servo control signal deriving means includes a circuit for producing a focusing error signal as the servo control signal, the response control signal producing means includes an operation control circuit for producing a command signal as the response control signal to command the optical lens a fast speed shift operation in the direction longitudinal to the laser beam, and the power supply voltage applying means applies the second power supply voltage to the BTL circuit in response to the fast speed longitudinal direction shift operation command signal.

32. The control system of claim 31, wherein the driving means includes means for shifting the optical lens in the direction longitudinal to the laser beam.

33. The control system of claim 32, wherein the longitudinal direction shifting means is a focusing actuator.

34. The control system of claim 22, wherein the servo control signal deriving means includes a circuit for producing a tracking error signal as the servo control signal, the response control signal producing means includes means responsive to the tracking error signal and the reproduced signal for detecting a signal dropout, and the power supply voltage applying means applies the first power supply voltage to the BTL circuit in response to the signal dropout detecting means.

35. The control system of claim 34, wherein the driving means includes means for shifting the optical lens in the direction perpendicular to the laser beam.

36. The control system of claim 35, wherein the perpendicular direction shifting means is a tracking actuator.

37. The control system of claim 34, wherein the driving means includes means for shifting the optical lens in the direction longitudinal to the laser beam.

38. The control system of claim 37, wherein the longitudinal direction shifting mean is a focusing actuator.

* * * * *